H. L. WEBER.
SIGNAL.
APPLICATION FILED MAY 24, 1919.
1,365,360.
Patented Jan. 11, 1921.
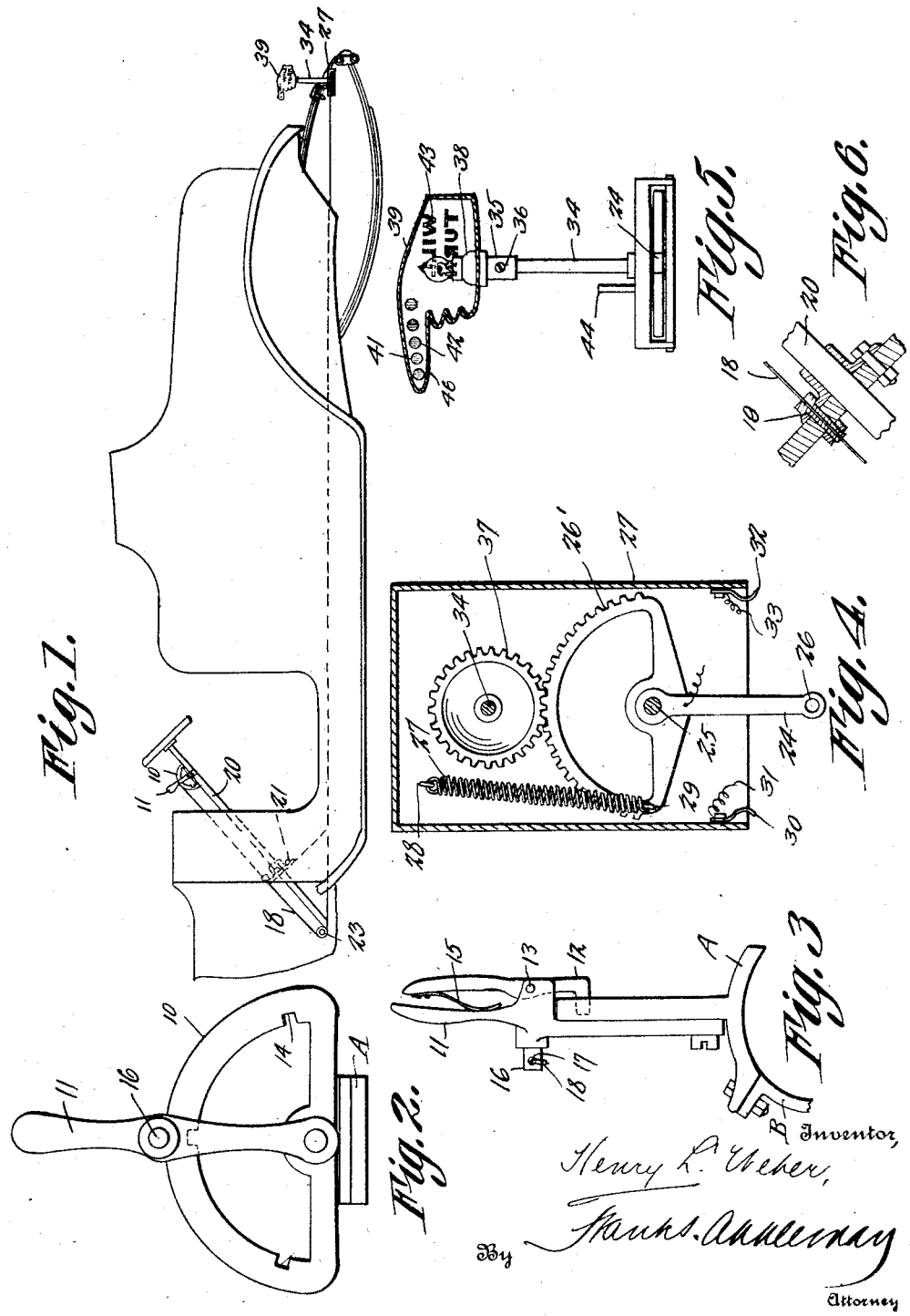
Inventor,
Henry L. Weber,
By Franks. Anderney
Attorney

UNITED STATES PATENT OFFICE.

HENRY L. WEBER, OF LOUISVILLE, KENTUCKY.

SIGNAL.

1,365,360.　　　　Specification of Letters Patent.　　Patented Jan. 11, 1921.

Application filed May 24, 1919. Serial No. 299,386.

*To all whom it may concern:*

Be it known that I, HENRY L. WEBER, a citizen of the United States of America, and resident of Louisville, in the county of Jefferson and State of Kentucky, have invented certain new and useful Improvements in Signals, of which the following is a specification.

This invention relates to signals and particularly to a manually operated device for indicating the direction of travel of a vehicle, such as an automobile.

An object of this invention is to provide novel means whereby an indicator may be controlled and operated to indicate the direction of intended travel either to the right or left or straight, that is to say the indicator may be set to point in a direction the vehicle is moving or it may be shifted to point or indicate the intended travel to the right or left, the said indicating means being manually controlled by the operator, as stated.

A further object of this invention is to provide novel means whereby the manually operated means shifting the pointer or indicator, controls the circuit to illuminate the signal.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a view in elevation of a fragment of an automobile with the invention applied thereto;

Fig. 2 illustrates a view in elevation of a controlling lever and quadrant;

Fig. 3 illustrates an edge view thereof;

Fig. 4 illustrates a sectional view of a casing with the mechanism therein in plan; and Fig. 5 illustrates a view in elevation of the signaling device, the same being partly in section.

In these drawings 10 denotes a quadrant with a lever 11 pivoted on it, the said quadrant having a detent 12 mounted on a pivot 13, which detent is adapted to enter recesses or notches 14 formed in the quadrant.

The detent is held normally in engagement with the quadrant through the medium of the spring 15 which bears against the lever 11 and the said lever has a stud 16 with an aperture 17 therein for the anchorage of a cable or wire 18 which cable or wire runs through an apertured bolt 19 which fastens the steering post 20 to the floor 21 of an automobile body, it being understood that the said post has an apertured flange 22 through which the bolt 19 passes. The cable or wire 18 operates over a sheave pulley 23 which is secured in place in any appropriate manner under the floor of the automobile and the said cable extends rearwardly and is connected to a stub shaft 25 by which the toothed segment 26' is partially rotatably mounted in the housing 27. It is to be understood that the housing may be of the type shown or it may be variously modified.

The housing has one open end through which the lever or arm 24 projects and the said arm has an eye 26 to which the cable 15 is attached so that the cable oscillates the arm to impart movement to the toothed segment. A spring 27 is anchored as at 28 to the casing and the opposite end of the said spring is attached to the toothed segment as at 29 so that the spring acts against the pull of the cable to restore the arm to its normal position shown in Fig. 4, and it also operates to pull the arm 24 in the direction of and into engagement with an electrical contact 30 which, by a conductor 31 may be energized, so that circuit is established through the said conductor 31, contact 30, arm 24, and connections, to be presently described, for illuminating the signal and the said casing has another contact 32 with a conductor 33 by which the signal may be illuminated when the arm 24 engages the said contact 32.

Within the casing or housing, there is journaled a shaft 34 which projects upwardly and it has a head 35 secured to it by the screw 36. There is a pinion 37 mounted on the shaft and it meshes with the toothed segment 26 and as the segment partially rotates, the pinion is partially rotated so as to communicate rotary motion to the shaft 34.

The head 35 terminates in an electric lamp socket 38 and the said head carries a signal or direction indicator 39 which is preferably of the general contour of a hand with the index finger 40 pointing. The direction indicator is hollow and the index finger has apertures 41, it being understood that the apertures are on both sides of the index finger so that light within the indicator may be seen through these apertures and preferably the apertures have ruby glass 42 inserted so that red lights will show through each aperture. Furthermore, the indicator or the housing forming the indicator has its walls cut in the outlines of letters as at 43 and any suitable legend may be indicated therethrough, such as "Will turn" so that when the indicator is turned to point to the right, anyone who can see the indicator will understand that the vehicle will turn in the direction which the pointer indicates. The movement of the indicator is such that it may turn to point to the right or left or it may be turned to point in a direction longitudinally of the body of the vehicle which is the normal or neutral position which it would occupy when the lever is in the position shown in Fig. 2.

The lamp socket 38 may be wired to establish circuit through the lamp when the arm 24 is in engagement with the contact 30 or 32 and as this wiring does not form a part of the present invention, it is believed unnecessary to show it in detail.

The casing 26 has an apertured flange 44 by which the said casing may be bolted or otherwise secured to the frame or other part of the automobile.

The quadrant has a curved base A which partially embraces the steering post and the said base is intended to be anchored to the steering post by known means, such as a clamping plate.

I claim—

In a direction indicator for automobiles, a housing adapted to be secured to an automobile, a pinion supported within the housing, a toothed segment pivotally supported within the housing and in mesh with the pinion, contact members supported by the housing adjacent one of the ends thereof, a lever having connection with the toothed segment and adapted to move therewith, an indicator supported by the pinion, an electric lamp within the indicator, an electrical circuit for supplying electricity to the electric lamp, said lever adapted to engage the contact members for completing the circuit to the electric lamp, means for returning the lever to its normal position and means for operating the lever.

HENRY L. WEBER.